United States Patent [19]

Dye

[11] Patent Number: 4,669,933

[45] Date of Patent: Jun. 2, 1987

[54] CHUCK FOR ROTARY METAL CUTTING TOOL

[76] Inventor: Leonard Dye, 11640 Davis St., Moreno Valley, Calif. 92388

[21] Appl. No.: 773,028

[22] Filed: Sep. 6, 1985

[51] Int. Cl.$^4$ .............................................. B23B 31/30
[52] U.S. Cl. ..................................... 409/136; 279/20; 408/59; 408/239 R; 409/234
[58] Field of Search ................. 408/56, 57, 59, 239 R; 279/20; 409/136, 232, 234

[56] References Cited

U.S. PATENT DOCUMENTS

| | | | |
|---|---|---|---|
| 3,364,800 | 1/1968 | Benjamin et al. | 279/20 X |
| 3,436,990 | 4/1969 | Tourison | 408/56 |
| 3,460,410 | 8/1969 | Briles | 408/57 |
| 4,557,643 | 12/1985 | Ciocci | 279/20 X |
| 4,570,952 | 2/1986 | Heimbigner et al. | 408/61 X |

FOREIGN PATENT DOCUMENTS

| | | | |
|---|---|---|---|
| 2838434 | 3/1979 | Fed. Rep. of Germany | 408/56 |
| 0083514 | 6/1980 | Japan | 408/59 |

*Primary Examiner*—Gil Weidenfeld
*Assistant Examiner*—Glenn L. Webb
*Attorney, Agent, or Firm*—Charles H. Thomas

[57] ABSTRACT

A chuck for a cylindrical, rotary, metal cutting tool, such as an end mill, is provided with a liquid coolant system. The chuck has a stationary, annular collar within which a tool holder rotates at high speed. An annular channel is defined between the collar and the tool holder and liquid coolant is pumped into the collar to the channel through an inlet on the collar. Internal ducts within the tool holder are directed inwardly at an angle from the annular channel toward an end face from which a rotary tool, such as an end mill protrudes. The ducts are also oriented at an angle corresponding to the helical spiral of flutes on the end mill and are radially aligned with troughs between the flutes. Liquid coolant, such as water, is forced from the annular channel through the ducts toward the troughs between the flutes. The liquid coolant travels all the way to the tip of the end mill to cool the bit and wash chips of metal therefrom with a minimum of water being thrown from the end mill by centrifugal force.

9 Claims, 7 Drawing Figures

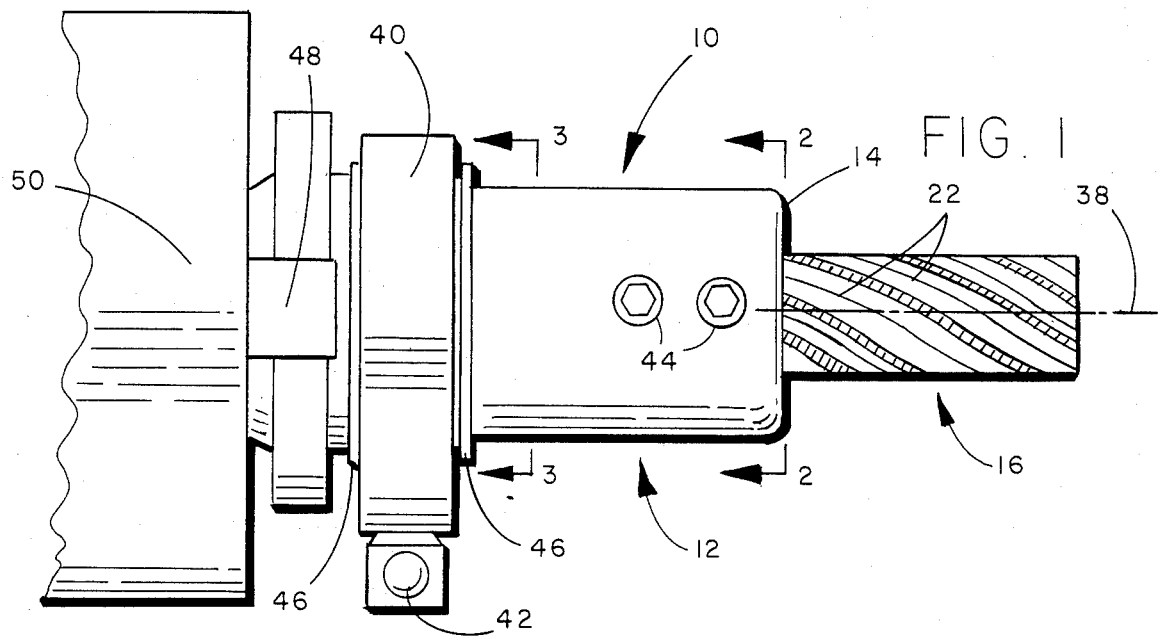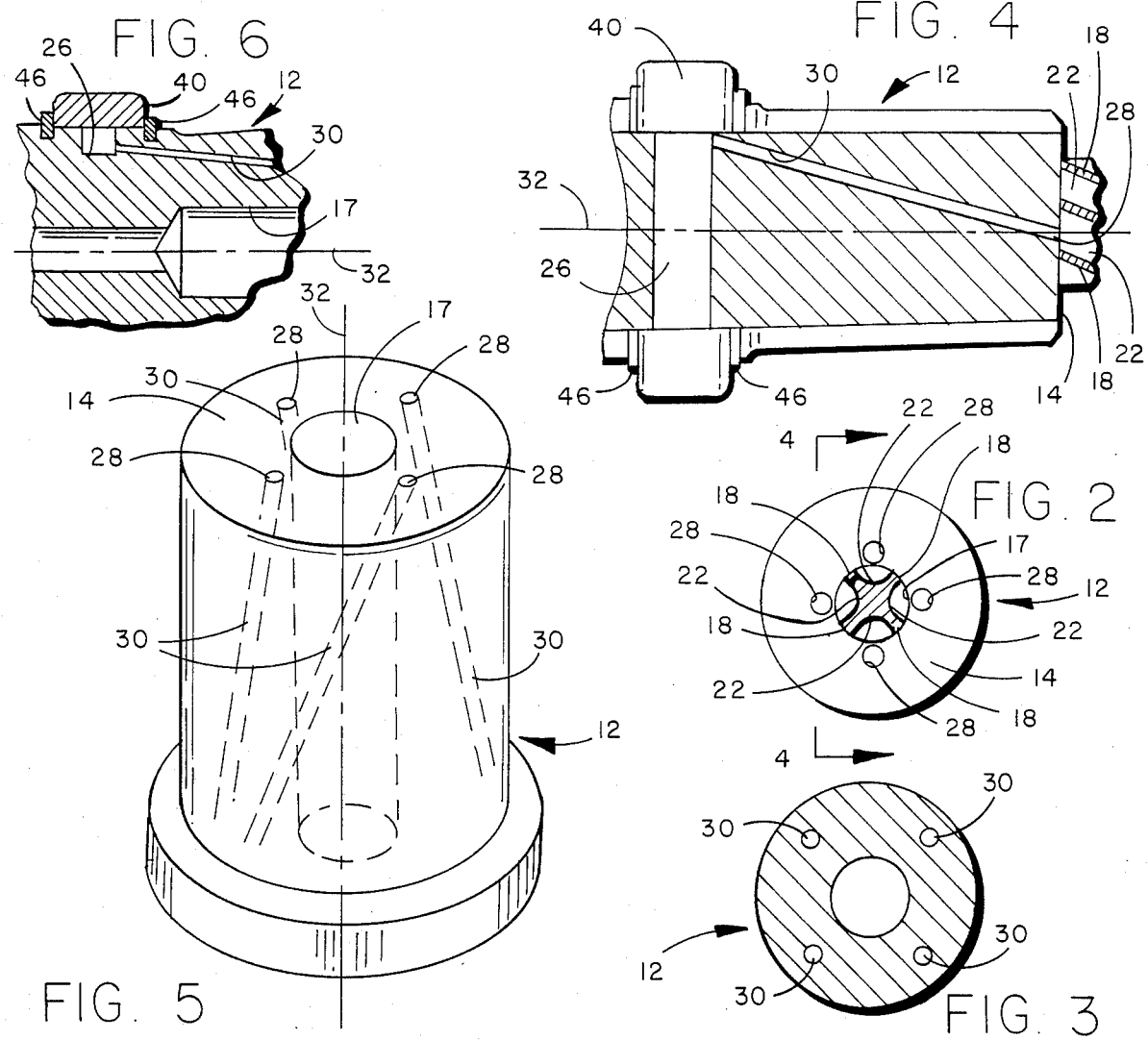

CHUCK FOR ROTARY METAL CUTTING TOOL

BACKGROUND OF THE INVENTION

1. Field Of The Invention

The present invention relates to an improved, liquid cooled chuck for a rotary, metal cutting tool, such as an end mill.

2. Description Of The Prior Art

There are numerous metal machining operations which employ cylindrical bits rotated at high speed to cut metal chips from a workpiece. Exemplary among such devices are end mills, shell mills, drills, routers, reams, bores, and other high speed, rotary systems which cut metal with a sharp bit. Various liquid coolant systems have been devised in attempts to prevent mill and drill bits from becoming dull rapidly. In conventional practice the bit of a drill or milling machine is cooled by merely spraying water from distance onto the rotating bit of the milling machine or drill. However, in actuality very little cooling water reaches the tip of the bit and most of the water is thrown from the bit by centrifugal force and vertical drop of gravity. As a result, the milling machine or drill bit will typically overheat and become dull. Furthermore, chips of material which are cut from the metal stock tend to cling to a mill or drill bit, thereby increasing the heat generated. This reduces the quality of milling and also dulls the bit more rapidly.

A number of systems have also been proposed which involve the creation of internal channels within deep hole drilling bits. These internal channels lead to openings at the tip of the bit. Liquid coolant, such as water, is pumped through such bits and emerges from the bit tips at the metal cutting site. However, complex machining is involved in order to produce bits of such intricate construction. Such internally cooled bits are not commercially feasible, since their production cost far exceeds the cost of conventional bits. Any increase in useful life of such intricate bits is more than offset by the cost of manufacture of such devices. In addition, the creation of internal channels within a bit is impossible with bits of very small diameter. Furthermore, the creation of internal channels within a bit inherently weakens the bit. A bit with internal passages is far more likely to break than a solid bit. Moreover, the problem is increased several orders of magnitude when end mills are provided with internal passages. While a drill bit is subjected primarily an end loading, an end mill is subjected primarily to a side load which acts perpendicular to the weakened length of a bit having internal, liquid conduits.

SUMMARY OF THE INVENTION

The present invention is an improved chuck for a cylindrical rotary tool having flutes thereon for cutting away metal. Fluted metal cutting tools of this type include end mills, drill bits, routers, reams, bores and other comparable metal cutting tools. The chuck of the invention is comprised of a cylindrical, annular, rotatable tool holder having a transverse end face in which an axial bore is defined to receive the shank of a cylindrical, fluted cutting tool. Some means, such as one or more set screws, must be provided for securing the tool shank in the tool holder so that it turns in rotation with the holder. The tool shank has a flat side against which the set screws bear. An annular cooling liquid distribution collar having a cooling liquid inlet is positioned about the tool holder remote from the end face. The tool holder is rotatable within the collar and the tool holder and the collar define an annular cooling liquid distribution channel therebetween. The annular liquid distribution channel is in communication with the cooling fluid inlet in the collar. A plurality of internal liquid distribution ducts or passageways are defined in the tool holder and extend from the liquid distribution channel at an inclination toward the axis of the tool holder to terminate at outlet ports in the end face. The liquid distribution ducts are radially aligned between flutes of the tool. The outlet ports are located closer to the axis of the tool holder than is the liquid distribution channel. The flat side of the tool shank serves to position the outlet ports in longitudinal alignment with the troughs defined between the flutes of the tool.

The foregoing construction applies primarily to an end mill holder. The invention may also be applied to a shell mill holder. In a shell mill holder a cylindrical annular sleeve is centered on the transverse end face and projects axially therefrom. The internal wall of the sleeve is tapped to receive a threaded draw bolt which serves as a releasable fastener for immobilizing the tool to rotate with the tool holder. Axially projecting keys are also defined on the transverse end face and extend radially outwardly from the internal sleeve. These keys fit into corresponding slots on the shell mill. The keys and slots cooperate to lock the shell mill to rotate with the shell mill holder. The keys also serve to align the outlet ports with the troughs between the flutes in the shell mill. The draw bolt fits into an axial counterbore in the shell mill and extends through an axial bore in the shell mill to engage the threads of the internal wall of the sleeve. The remaining structure of the shell mill holder corresponds to that of an end mill holder, as described in the preceding paragraph.

A tool holder constructed according to the invention has a very significant advantage over the conventional practice of spraying water onto a rotating metal cutting tool. The liquid ducts, considered as projected onto a plane containing the holder axis, are inclined at an acute angle so that the water emerging from the ports is directed toward the cuttng tool with both a radial and a longitudinal component of force. The longitudinal component of force tends to carry the water to the remote, free end of the cutting tool, while the radial component of force acts in opposition to the centrifugal force tending to fling the water away from the cutting tool. Furthermore, the orientaton of the ducts in radial alignment with the troughs between adjacent flutes causes the liquid coolant to be carried rapidly toward the remote, free end of the cutting tool. Cooling is needed most at the remote free end before the centrifugal force imparted to the water by the rotating cutting tool flings the water free from the rotating tool.

The angle at which the ducts are preferably formed relative to the tool holder axis, when considered in a plane containing the tool holder axis, is ideally the maximum acute angle which will overcome the centrifugal force but still allow the coolant to reach the tip of the cutting tool. The greater the rotary speed of the tool holder, the greater the desired incline of the duct inwardly towardy the tool holder axis. That is, the ducts should be more steeply inclined relative to the tool holder axis for a high rotary speed in order to overcome the greater, opposing centrifugal force tending to throw the water clear from the cutting tool.

The preferred angle of inclination of the ducts relative to the tool holder axis will also increase with the diameter of the metal cutting bit. The angle will decrease with increasing liquid pressure and flow rate. Typically the ducts are inclined toward the holder axis at an acute angle between about two degrees and about thirty degrees, when considered as projected onto a plane containing the tool holder axis. Also, when the flutes and troughs are helical, the ducts are preferably positioned between longitudinal alignment with said troughs and an angle of about 30 degrees relative to the helical angle of said troughs, when considered in planes containing the ducts and oriented perpendicular to radial lines from the tool holder axis.

The improved chuck of the invention may be used with machine tools that are rotated about either a vertical or a horizontal axis. The chuck of the invention is used most advantageously with a roughing type end mill where intense heat is created, and with tools which are rotated about horizontal axes.

According to the invention the chuck is provided with an annular coolant collar within which the tool holder rotates. An annular liquid distribution channel is defined at the interface between the rotating tool holder and the stationary coolant collar. The channel may be defined in the structure of the coolant collar, but preferably is formed by an annular groove in the outer surface of the tool holder remote from the cuttng tool. The collar is held in place on the tool holder by a pair of snap rings or a shoulder and a single snap ring. Seals, such as O-rings may be positioned on both sides of the channel to provide seals between the collar and the tool holder. The liquid distribution channel serves as a manifold, and coolant passes therefrom through the inclined passageways or ducts and is ejected from the tool holder through outlet ports in the transverse end face thereof, remote from the distribution channel.

The passageways or ducts are inclined considered both in planes containing the holder axis, and also in planes perpendicular to radial lines from the tool holder axis and intersecting the ducts. This inclination of the ducts is a principal difference between the present invention and prior coolant distribution systems. The ducts of the present invention do not employ radial passageways leading to passageways lying along the axes of rotation. That is, the ducts do not lie within planes containing the tool holder axis, but rather are oriented along lines which intersect such planes. The ends of the ducts are in radial alignment with the troughs which separate the flutes of the metal cutting tool, so that water passes from the ports in the end face of the tool holder along paths which smoothly direct the water into the troughs of the cutting tool. The outlet ports in the end face of the tool holder are located proximate to an axial bore in the tool holder within which the metal cutting tool bit is immobilized. These ports are closer to the tool holder axis than is the distribution channel, so that the water is directed toward the fluted cutting tool with radial components of force, as well as with components along the spiral paths of the cutting tool troughs.

The invention may be described with greater clarity and particularity by reference to the accompanying drawings.

DESCRIPTION OF THE DRAWINGS

FIG. 1 a side elevational view illustrating one embodiment of a chuck for a cylindrical end mill according to the invention.

FIG. 2 is a transverse view taken along the lines 2—2 of FIG. 1.

FIG. 3 is a transverse sectional view taken along the lines 3—3 of FIG. 1.

FIG. 4 is a longitudinal sectional view taken along the lines 4—4 of 2.

FIG. 5 is a perspective view of the tool holder of FIG. 1.

FIG. 6 is a longitudinal sectional detail showing the liquid distribution channel of the embodiment of FIG. 1.

DESCRIPTION OF THE EMBODIMENTS

Figure 7:
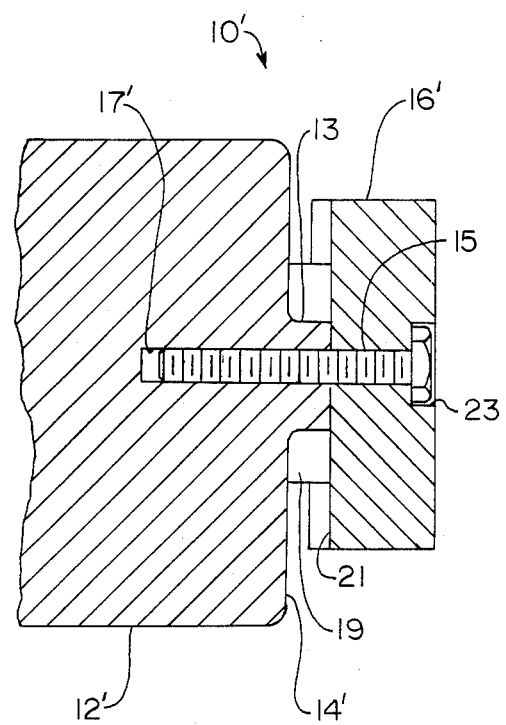
FIG. 7 is a sectional elevational view illustrating an alternative embodiment of a chuck for a cylindical shell mill according to the invention.

FIG. 1 illustrates an improved end mill chuck 10. The chuck 10 is formed of a cylindrical, annular tool holder 12 having a transverse end face 14, visible in FIG. 2, with an axial bore 17 therein. The bore 17 receives the shank of a solid, generally cylindrical end mill 16. The end mill 16 has raised, helical flutes 18 formed thereon which are separated by helical troughs 22 therebetween. An annular radial channel 24, visible in FIGS. 4 and 6, is defined in the outer surface of the tool holder 12 remote from the end face 14. Outlet ports 28, depicted in FIGS. 2 and 4, are defined in the end face 14 proximate to the axial bore 17 therein. Linear internal ducts 30, visible in FIGS. 3-6, extend from the outlet ports 28 within the structure of the tool holder 12 and are oriented for radial alignment with the helical troughs 22, as best depicted in FIG. 2 and 4. The ducts 30 are also at an angle relative to the tool holder axis 32, considered in planes containing the ducts 30 and perpendicular to radial lines from the tool holder axis, as depicted in FIG. 4. This angle of alignment is equal to the helical angle of the troughs 22 relative to the end mill axis 38. The outlet ports 28 are closer to the tool holder axis 32 than is the annular channel 26.

The chuck 10 includes an annular collar 40 which has a liquid coolant inlet 42. The tool holder 12 is mounted for rotation within the annular collar 40 in longitudinal alignment with the annular channel 26. Liquid coolant is supplied from the inlet 42, through the annular channel 26 and through the ducts 30 to the ports 28, where the water is directed into the troughs 22 of the end mill bit 16.

The tool holder 12 is formed of steel and has two radial, tapped bores that extend from the outer cylindrical surface to the axial bore 17. Set screws 44 are threadably engaged in the tapped radial bores. The set screws 44, when engaged, bear against the shank of the end mill 16 to immobilize the end mill 16 relative to the tool holder 12. The end mill 16 therefore turns in rotation with the tool holder 12. The set screws 44 should straddle any two coolant passageways 30 regardless of the position of the passageways.

The end mill 16 is a standard, unmodified helically fluted, cutting bit which may be a roughing end mill purchased commercially, for example, from the Strassmann Tool Company in West Germany. The end mill 16 may, for example, have a metric diameter of between ten milimeters and one hundred milimeters. Alternatively, the diameter of the end mill 16 may vary from three-eights of an inch to three inches in diameter, or even greater.

A chuck 10' similar to the chuck 10 may also be utilized with shell mills, which are large end mills having a diameter of perhaps 4 or 5 inches and a length of perhaps 2 inches. In the chuck 10' a cylindrical annular sleeve 13 is centered on the transverse end face 14' and projects axially therefrom. The internal wall of the sleeve 13 is tapped to receive a threaded draw bolt 15 which serves as a releasable fastener for immobilizing the shell mill 16' to rotate with the tool holder. Axially projecting keys 19 are also defined on the transverse end face and extend radially outwardly from the internal sleeve. These keys fit into corresponding slots 21 on the shell mill 16'. The keys 19 and slots 21 cooperate to lock the shell mill to rotate with the shell mill holder 12'. The keys also serve to align the outlet ports 28' with the troughs between the flutes in the shell mill. The draw bolt 15 fits into an axial counterbore 23 in the shell mill and extends through an axial bore in the shell mill 20 to engage the threads of the internal wall 15' of the sleeve. The remaining structure of the shell mill holder 12' corresponds to that of an end mill holder 12.

The coolant inlet 42 illustrated in FIG. 1 may be a three eighths inch, threaded ninety degree elbow fitting threadably engaged in a tapped, radial bore in the coolant collar 40. A pair of snap rings 46 maintain the coolant collar 40 in proper longitudinal alignment with the annular distribution channel 26. Keys 48, on opposite sides of the tool holder 12 engage the tool holder 12 to turn it in rotation by means of a powered, rotary drive spindle 50.

Just like conventional water cooled end mill and shell mill cutting systems, the chuck 10 of the present invention involves no modification whatsoever to the end mill 16. Although one of the objects of the invention is to prolong the useful life of the end mill 16, the end mill 16 will wear out and must ultimatly be replaced. The end mill 16 is, therefore, essentially a disposable item, but can be reground several times depending upon the extent of damage which it has sustained. Other objects of the invention include enhancement of the cutting speeds with which the cutter rotates and an increase in the rate of feed with which the tool travels along the workpiece.

The improvement of the invention resides in the provision to the chuck 10 of the annular collar 40 in combination with the inclined ducts 30. The ducts 30 lead from the annular liquid distribution channel 26 and slope toward the tool holder axis 32 to emerge from the tool holder at the outlet ports 28. The outlet ports 28 are located proximate to the axial bore 17 and in radial and longitudinal alignment with the troughs 22 between the flutes 18. As is evident from FIGS. 2 through 5, the ducts 30 slope inwardly from their intersection with the annular distribution channel 26 near the outer periphery of the tool holder 12 toward the outlet ports 28 which are located much closer to the tool holder axis 32 than is the distribution channel 26. Because the flutes 18 on the end mills 16 are helical, the ducts 30 do not lie in planes containing the tool holder axis 32, and linear extensions of the ducts 30 would not intersect the axis 32. To the contrary, extensions of the ducts 30 would never intersect the tool holder axis 32.

As is evident from FIG. 4, the ducts 30 are oriented at the same acute angle relative to the tool holder axis 32 as the troughs 22, as viewed in a plane containing a duct 30, which plane is also perpendicular to a radial line emanating from the tool holder axis 32. The alignment of the ducts 30 in line with the troughs 22 facilitates the movement of jets of water squirting from the ports 28 longitudinally along the end mill 16. That is, the jets of water emanating from the outlet ports 28 flow in streams into the troughs 22. The water is channeled by the flutes 18 on either side of the troughs 22 toward the remote tip of the end mill 16.

Since there is also a radially inwardly directed component of force urging the streams of water inwardly toward the axis of the end mill 16, the streams of water resist the centrifugal force tending to cast the water outwardly away from the end mill 16. The water thereby remains in contact with the end mill 16 along its entire length, and is thus able to perform the intended function of cooling the end mill, to prevent the end mill 16 from becoming dull quickly. By remaining in contact with the end mill 16 longer, the water is also able to flush chips of metal away from the end mill 16. This improves the ability to control the chips and enables the end mill 16, or any other cutting bit, to take a greater depth of cut.

The system of the invention also provide a permanent coolant supply which requires no adjustment by an operator. The attention of the operator is therefore not distracted from the operation of the end mill 16. This eliminates a potential safety hazard which might otherwise result from distraction of the operator.

Undoubtedly, numerous variations and modifications of the invention will become readily apparent to those familiar with metal cutting operations. For example, the invention may be utilized with a metal cutting tool which rotates about a vertical axis, as well as a horizontal axis. Also, the invention may be employed with drills and other boring or reaming tools, as well as with end mills. Accordingly, the scope of the invention should not be construed as limited to the specific embodiment depicted and described, but rather is defined in the claims appended hereto.

I claim:

1. An improved chuck for a rotary tool having helical flutes thereon for cutting away metal comprised of an annular, rotatable tool holder having a transverse end face in which an axial bore is defined to receive said tool, means for securing said tool in said tool holder to turn in rotation therewith, an annular, cooling liquid distribution collar having a cooling liquid inlet and positioned about said tool holder remote from said end face, whereby said tool holder is rotatable within said collar and said collar and said tool holder define an annular cooling liquid distribution channel therebetween in communication with said cooling fluid inlet, and a plurality of liquid distribution ducts are defined in said tool holder in planes perpendicular to radial lines emananting from the axis of rotation of said tool holder to extend from said liquid distribution channel at an inclination toward the axis of said tool holder to terminate in outlet ports in said end face, and said liquid distribution ducts are radially aligned between flutes of said tool and said outlet ports are located closer to the axis of said tool holder than is said liquid distribution channel.

2. A chuck according to claim 1 wherein said ducts are also lognitudinally aligned with said flutes of said tool.

3. A chuck according to claim 1 wherein said ducts are inclined toward said tool holder axis at an acute angle of between about 2 degrees and about 30 degrees.

4. A chuck according to claim 3 wherein said flutes on said tool are helical.

5. A chuck according to claim 4 in which said annular cooling liquid distribution channel is defined in the outer surface of said tool holder.

6. In a chuck for a metal cutting shell mill having helical flutes thereon separated by helical troughs and having an annular tool holder with a transverse face and an annular sleeve centered thereon having a tapped axial bore therein and releasable fastening means for immobilizing said shell mill to rotate with said tool holder, the improvement comprising an annular coolar having a liquid inlet and within which said tool holder is mounted for rotation, whereby said tool holder and said collar define an annular liquid distribution channel therebetween at the outer periphery of said tool holder, which channel is in liquid communication with said liquid inlet, and a plurality of elongated ducts are defined within said tool holder in planes perpendicular to radial lines emanating from the axis of rotation of said tool holder to lead from said annular liquid distribution channel and said ducts slope toward said tool holder axis to terminate at outlet ports in said transverse face which are located proximate to said annular sleeve and in radial and longitudinal alignment with said troughs between said flutes.

7. A chuck according to claim 3 wherein said flutes and said troughs on said tool are helical and said liquid distibution ducts are positioned between longitudinal alignment with said troughs and an angle of about 30 degrees relative to the helical angle of said troughs.

8. A chuck according to claim 5 wherein said annular liquid distribution channel is formed by a groove in the surface of said tool holder remote from said transverse face.

9. An improved end mill chuck comprising: an annular tool holder having a transverse end face with an axial bore therein adapted to receive the shank of a solid end mill having helical flutes thereon separated by helical troughs therebetween, wherein an annular, radial channel is defined in the outer surface of said tool holder remote from said end face, and outlet ports are defined in said end face proximate to said axial bore therein, and ducts extend from said outlet ports within the structure of said holder in planes perpendicular to radial lines emanating from the axis of rotation of said tool holder and are oriented for radial alignment with said helical troughs and are at an angle relative to the tool holder axis equal to the helical angle of said troughs relative to the axis of said end mill, and said outlet ports are closer to said tool holder than is said annular channel, and an annular collar is provided having a liquid coolant inlet and within which said tool holder is mounted for rotation with said annular collar in longitudinal alignment with said annular channel, whereby liquid coolant is supplied from said inlet, through said annular channel and through said ducts and from said ports into said troughs of said end mill.

* * * * *